J. A. BRAESE.
RESILIENT WHEEL.
APPLICATION FILED JULY 28, 1919.
1,349,599.
Patented Aug. 17, 1920.
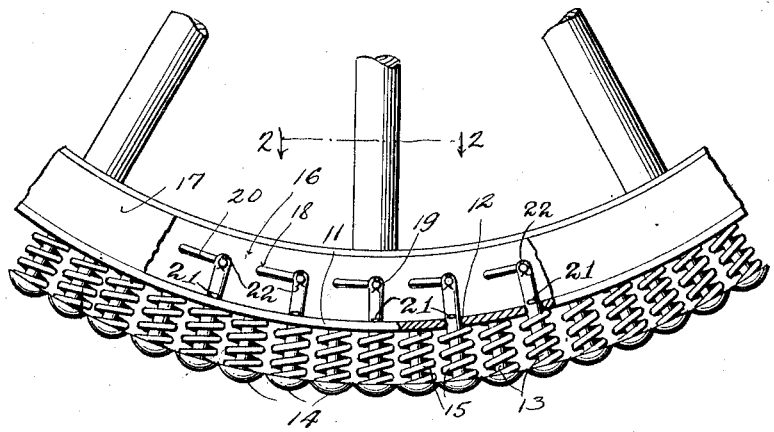
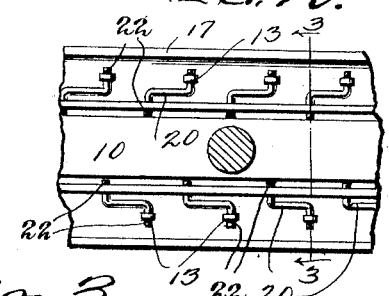
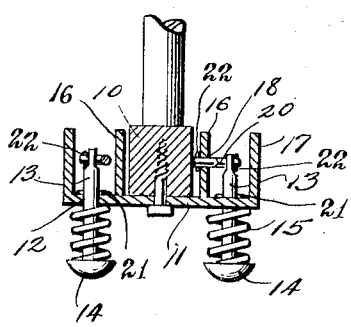
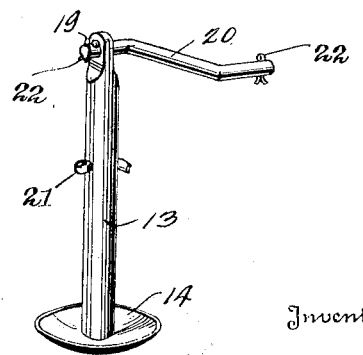
Inventor
John A. Braese
Attorney

UNITED STATES PATENT OFFICE.

JOHN A. BRAESE, OF MOUND, NORTH DAKOTA.

RESILIENT WHEEL.

1,349,599.    Specification of Letters Patent.    Patented Aug. 17, 1920.

Application filed July 28, 1919. Serial No. 313,684.

*To all whom it may concern:*

Be it known that I, JOHN A. BRAESE, a citizen of the United States, residing at Mound, in the county of Billings, State of North Dakota, have invented certain new and useful Improvements in Resilient Wheels; and I do hereby declare the following to be a full, clear, and exact description of the invention, such as will enable others skilled in the art to which it appertains to make and use the same.

This invention relates to improvements in wheels, and particularly to resilient wheels.

The principal object of the invention is to provide a simple and novel resilient tread for the wheel of a heavy car or other vehicle.

Other objects and advantages will be apparent from the following description when taken in connection with the accompanying drawings.

In the drawings:

Figure 1 is a side elevation of a portion of the wheel made in accordance with my invention, the same being broken away and partly in section.

Fig. 2 is a horizontal sectional view on the line 2—2 of Fig. 1,

Fig. 3 is a transverse section on the line 3—3 of Fig. 2, and

Fig. 4 is a detail perspective view of one of the pins with its link.

Referring particularly to the accompanying drawing, 10 represents the felly of the wheel to which is secured a rim 11, said rim projecting suitable distances on both sides of the felly. The projecting portions of the rim are formed with a plurality of openings 12, these openings extending in circular series around the rim. Disposed through these openings are pins 13, the outer ends of which are provided with suitable heads 14, and encircling the pins between the rim and the heads are coil springs 15. Carried by the inner face of the rim 11, and on each opposite side of the felly are the parallel radial flanges 16 and 17, the former of which is formed with a circular series of openings 18 while the latter or outer ones are imperforate. The inner ends of the pins 13 are disposed between these pairs of flanges and have transverse openings 19 in their inner ends each of which receives one end of a substantially Z-shaped link 20, the other end of the link being disposed in one of the openings 18 of the ring 16. These openings 18 of each flange 16 are disposed at points approximately midway between the adjacent pins 13 and the links extend from the inner ends of the pins toward the sides of the felly and into the said openings 18. These Z-shaped links serve to position the pins 13 at proper angles to the tread of the wheel as they work back and forth through the perforations of the rim 11.

The springs 15 are of sufficient strength to yieldably support the weight of a heavy vehicle.

Through the intermediate portion of each pin 13 is a cotter pin 21 which bears against the inner face of the rim 11 to limit the outward movement of the pin slidably through the opening of the rim. Through the ends of the links 20 are disposed the cotter pins 22 for holding the links in the openings of the flanges 16, and in the openings of the inner ends of the pins 13.

What is claimed is:

A resilient wheel including a felly, a rim secured to the felly and extending on opposite sides thereof, said extending portions of the rim being formed with openings, headed pins disposed slidably through the openings, springs mounted on the pins between the rim and the heads thereof, parallel flanges on the inner face of the rim and receiving the inner ends of the pins therebetween, the inner of the flanges having openings disposed at points between the pins, and substantially Z-shaped members having one of their ends disposed through the inner ends of the pins and the other ends within the openings of the inner flanges.

In testimony whereof, I affix my signature, in the presence of two witnesses.

JOHN A. BRAESE.

Witnesses:
FRANK BIERMAN,
JOHN KIESBY.